United States Patent
Evans et al.

(10) Patent No.: US 7,209,573 B2
(45) Date of Patent: Apr. 24, 2007

(54) SUBSTITUTING IMAGES IN COPIES BASED ON DIGITAL WATERMARKS

(75) Inventors: Douglas B. Evans, San Francisco, CA (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 11/145,515

(22) Filed: Jun. 3, 2005

(65) Prior Publication Data

US 2005/0271305 A1 Dec. 8, 2005

Related U.S. Application Data

(63) Continuation of application No. 10/448,544, filed on May 29, 2003, now Pat. No. 6,917,691, which is a continuation of application No. 09/473,396, filed on Dec. 28, 1999, now Pat. No. 6,577,746.

(51) Int. Cl.
*G06K 9/00* (2006.01)
*G06K 15/00* (2006.01)
*G06K 9/36* (2006.01)

(52) U.S. Cl. ..................... 382/100; 358/3.28

(58) Field of Classification Search ............... 382/100, 382/112, 232, 305, 306; 358/1.13, 1.18, 358/3.28; 380/203, 252; 705/75; 713/176
See application file for complete search history.

(56) References Cited

U.S. PATENT DOCUMENTS

| | | | |
|---|---|---|---|
| 4,395,600 A | 7/1983 | Lundy et al. | |
| 4,969,041 A | 11/1990 | O'Grady et al. | |
| 5,010,405 A | 4/1991 | Schreiber | |
| 5,113,445 A | 5/1992 | Wange | |
| 5,385,371 A | 1/1995 | Izawa | |
| 5,444,518 A | 8/1995 | Hashiguchi et al. | |
| 5,448,375 A | 9/1995 | Cooper et al. | |
| 5,486,686 A | 1/1996 | Zdybel, Jr. | |
| 5,495,581 A | 2/1996 | Tsai | |
| 5,502,576 A | 3/1996 | Ramsay | |
| 5,515,451 A | 5/1996 | Tsuji | |
| 5,530,759 A | 6/1996 | Braudaway | |
| 5,581,686 A | 12/1996 | Koppolu | |
| 5,581,760 A | 12/1996 | Atkinson | |
| 5,592,622 A | 1/1997 | Isfeld et al. | |
| 5,668,636 A | 9/1997 | Beach | |
| 5,692,073 A | 11/1997 | Cass | |
| 5,717,940 A | 2/1998 | Peairs et al. | |

(Continued)

FOREIGN PATENT DOCUMENTS

EP 493 091 7/1992

(Continued)

OTHER PUBLICATIONS

U.S. Appl. No. 09/185,380, filed Oct. 3, 1998, Davis et al.

(Continued)

*Primary Examiner*—Yon J. Couso

(57) ABSTRACT

Digital watermarking is provided in a printed photograph. The digital watermarking includes an identifier. The printed photograph is scanned and the digital watermark is decoded to obtain the identifier. The identifier is used to obtain a substitute image for use when generating a copy of the printed photograph. A user interface can be provided to allow a user to select options prior to printing the copy.

18 Claims, 1 Drawing Sheet

U.S. PATENT DOCUMENTS

| | | | |
|---|---|---|---|
| 5,754,308 | A | 5/1998 | Lopresti et al. |
| 5,765,152 | A | 6/1998 | Erickson |
| 5,765,176 | A | 6/1998 | Bloomberg |
| 5,809,317 | A | 9/1998 | Kogan |
| 5,838,458 | A | 11/1998 | Tsai |
| 5,838,459 | A | 11/1998 | Tsai |
| 5,859,935 | A | 1/1999 | Johnson et al. |
| 5,866,888 | A | 2/1999 | Bravman et al. |
| 5,878,434 | A | 3/1999 | Draper et al. |
| 5,892,900 | A | 4/1999 | Ginter et al. |
| 5,893,908 | A | 4/1999 | Cullen et al. |
| 5,901,224 | A | 5/1999 | Hecht |
| 5,915,027 | A * | 6/1999 | Cox et al. ............. 380/54 |
| 5,932,862 | A | 8/1999 | Hussey et al. |
| 5,943,422 | A | 8/1999 | Van Wie et al. |
| 5,946,414 | A | 8/1999 | Cass et al. |
| 5,949,885 | A | 9/1999 | Leighton |
| 5,974,548 | A | 10/1999 | Adams |
| 5,978,477 | A | 11/1999 | Hull et al. |
| 5,978,773 | A | 11/1999 | Hudetz et al. |
| 5,986,651 | A | 11/1999 | Reber et al. |
| 5,995,105 | A | 11/1999 | Reber et al. |
| 5,995,978 | A | 11/1999 | Cullen et al. |
| 6,006,226 | A | 12/1999 | Cullen et al. |
| 6,085,205 | A | 7/2000 | Peairs et al. |
| 6,324,574 | B1 | 9/2000 | Rhoads |
| 6,182,090 | B1 | 1/2001 | Peairs |
| 6,199,073 | B1 | 3/2001 | Peairs et al. |
| 6,252,963 | B1 | 6/2001 | Rhoads |
| 6,286,036 | B1 | 9/2001 | Rhoads |
| 6,311,214 | B1 | 10/2001 | Rhoads |
| 6,314,457 | B1 | 11/2001 | Schena |
| 6,334,721 | B1 | 1/2002 | Horigane |
| 6,343,138 | B1 | 1/2002 | Rhoads |
| 6,345,104 | B1 | 2/2002 | Rhoads |
| 6,351,815 | B1 | 2/2002 | Adams |
| 6,366,685 | B1 | 4/2002 | Terasaki |
| 6,427,020 | B1 | 7/2002 | Rhoads |
| 6,439,465 | B1 | 8/2002 | Bloomberg |
| 6,445,468 | B1 | 9/2002 | Tsai |
| 6,449,377 | B1 | 9/2002 | Rhoads |
| 6,466,329 | B1 | 10/2002 | Mukai |
| 6,490,681 | B1 | 12/2002 | Kobayashi |
| 6,505,160 | B1 | 1/2003 | Levy et al. |
| 6,512,837 | B1 | 1/2003 | Ahmed |
| 6,515,755 | B1 | 2/2003 | Hasegawa |
| 6,522,770 | B1 | 2/2003 | Seder et al. |
| 6,522,771 | B2 | 2/2003 | Rhoads |
| 6,549,638 | B2 | 4/2003 | Davis et al. |
| 6,574,350 | B1 | 6/2003 | Rhoads et al. |
| 6,577,746 | B1 | 6/2003 | Evans et al. |
| 6,580,819 | B1 | 6/2003 | Rhoads |
| 6,600,571 | B1 * | 7/2003 | Ito ..................... 358/1.15 |
| 6,668,068 | B2 * | 12/2003 | Hashimoto ............. 382/100 |
| 6,786,397 | B2 | 9/2004 | Silverbrook et al. |
| 6,804,376 | B2 | 10/2004 | Rhoads et al. |
| 6,829,368 | B2 | 12/2004 | Meyer et al. |
| 2001/0016852 | A1 | 8/2001 | Peairs et al. |
| 2001/0022667 | A1 | 9/2001 | Yoda |
| 2001/0026377 | A1 | 10/2001 | Ikegami |
| 2001/0028725 | A1 | 10/2001 | Nakagawa |
| 2001/0031066 | A1 | 10/2001 | Meyer et al. |
| 2001/0043362 | A1 | 11/2001 | Hull et al. |
| 2002/0010684 | A1 | 1/2002 | Moskowitz |
| 2002/0023148 | A1 | 2/2002 | Ritz |
| 2002/0027994 | A1 | 3/2002 | Katayama |
| 2002/0037091 | A1 | 3/2002 | Terasaki |
| 2002/0040323 | A1 | 4/2002 | Lee |
| 2002/0049580 | A1 | 4/2002 | Kutaragi |
| 2002/0059384 | A1 | 5/2002 | Kaars |
| 2002/0071556 | A1 | 6/2002 | Moskowitz |
| 2002/0073319 | A1 | 6/2002 | Manabe |
| 2002/0075298 | A1 | 6/2002 | Schena |
| 2002/0080396 | A1 | 6/2002 | Silverbrook |
| 2002/0080964 | A1 | 6/2002 | Stone |
| 2002/0120515 | A1 | 8/2002 | Morimoto |
| 2002/0126762 | A1 | 9/2002 | Tanaka |
| 2002/0154778 | A1 | 10/2002 | Mihcak |
| 2002/0165793 | A1 | 11/2002 | Brand |
| 2003/0069852 | A1 | 4/2003 | Bryant |
| 2003/0077096 | A1 | 4/2003 | Potter |
| 2004/0148408 | A1 | 7/2004 | Nadarajah |

FOREIGN PATENT DOCUMENTS

| | | |
|---|---|---|
| EP | 975147 | 1/2000 |
| EP | 1147495 | 10/2001 |
| GB | 2344482 | 6/2000 |
| GB | 2346110 | 8/2000 |
| JP | 08/50598 | 2/1996 |
| WO | 98/20411 | 5/1998 |
| WO | WO 98/20411 | 5/1998 |
| WO | WO 02/03385 | 1/2002 |
| WO | WO 0239719 | 5/2002 |

OTHER PUBLICATIONS

U.S. Appl. No. 09/504,239, filed Feb. 15, 2000, Davis et al.
U.S. Appl. No. 09/679,261, filed Oct. 4, 2000, Davis et al.
U.S. Appl. No. 09/858,189, filed Mar. 14, 2001, Rhoads et al.
Peairs, "Iconic Paper," Proceeedings of the Third International Conference of Document Analysis and Recognition, Aug. 14-16, 1995, 1174-1179.
SDMI Example Use Scenarios (Non-Exhaustive), Version 1.2, Jun. 16, 1999.
Zhao, "A WWW Service to Embed and Prove Digital Copyright Watermarks," Fraunhofer Institute for Computer Graphics, Proc. of EU Conf. on Multimedia Applications, Services and Techniques, May 1996, 15 pages.
Bloomberg, "Embedding Digital Data on Paper in Iconic Text" SPIE vol. 3027, Document Recognition IV, pp. 67-80 (1997).
Johnson, et al., "Bridging the Paper and Electronic Worlds: The Paper User Interface", Interchi '93, pp. 507-512, Apr. 1993.
Newman, William, et al., "A Desk Supporting Computer-Based Interaction with paper Documents," ACM Conference on Human Factors in Computing Systems (CHI '92) May 3-7, 1992, pp. 587-592.
Rao, et al., "Protofoil: Storing and Finding the Information Worker's Paper Documents in an Electronic File Cabinet," Human Factors in Computing Systems (CHI '94), pp. 180-186, Boston, MA, Apr. 1994.
van Schyndel et al., "A Digital Watermark," *IEEE International Conference on Image Processing,* Nov. 13-16, 1994, pp. 86-90.
Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).

\* cited by examiner

SUBSTITUTING IMAGES IN COPIES BASED ON DIGITAL WATERMARKS

RELATED APPLICATION DATA

This application is a continuation of U.S. patent application Ser. No. 10/448,544, filed May 29, 2003 (published as US 2003-0202681 A1) now U.S. Pat. No. 6,917,691, which is a continuation of U.S. patent application Ser. No. 09/473,396, filed Dec. 28, 1999 (now U.S. Pat. No. 6,577,746). Each of these patent documents are each hereby incorporated by reference.

FIELD OF THE INVENTION

The present invention relates to data processing, and more particularly relates to use of watermark technology for object substitution.

BACKGROUND AND SUMMARY OF THE INVENTION

Object linking and embedding ("OLE," sometimes also known as dynamic data exchange, or "DDE") is a well-known data processing construct by which a first digital object (e.g., a graph) can be embedded within a second digital object (e.g., a word processing document). In some embodiments, the embedding is static. That is, once the embedding takes place, subsequent changes to the first digital object (e.g., the graph) are not reflected in the second, composite digital object (e.g., the document). In other embodiments, the embedding is dynamic (and thus more commonly termed linking rather than embedding). In such arrangements, if the graph is changed, the document is automatically updated to incorporate the latest version of the graph.

The technology underlying OLE is sophisticated, but is well understood by artisans in the field. Reference may be made to the many patents (e.g., U.S. Pat. Nos. 5,581,760 and 5,581,686) and reference books (e.g., Brockschmidt, *Inside OLE* 2, Microsoft Press, Redmond, Wash., 1994) on the subject for further details.

In accordance with the present invention, OLE-like principles are implemented using watermark data in digital objects in order to effect object linking or embedding.

In one illustrative embodiment, a photocopier scans an original paper document to produce image data. This image data is analyzed for the presence of watermark data that identifies the graphic(s) on the document. With this watermark identifier, the photocopier can query a remote image database for pristine image data corresponding to the graphic(s) on the document. This pristine data can be relayed from the remote database to the photocopier and substituted into the scanned image data. Output printed from the photocopier is thus based, at least in part, on pristine image data, rather than on image data that has been subjected to various corruption mechanisms (e.g., degradation of the original paper document, artifacts due to scanning, etc.).

The foregoing and other features and advantages of the present invention will be more readily apparent from the following detailed description, which proceeds with reference to the accompanying drawings.

DETAILED DESCRIPTION

Figure 1:
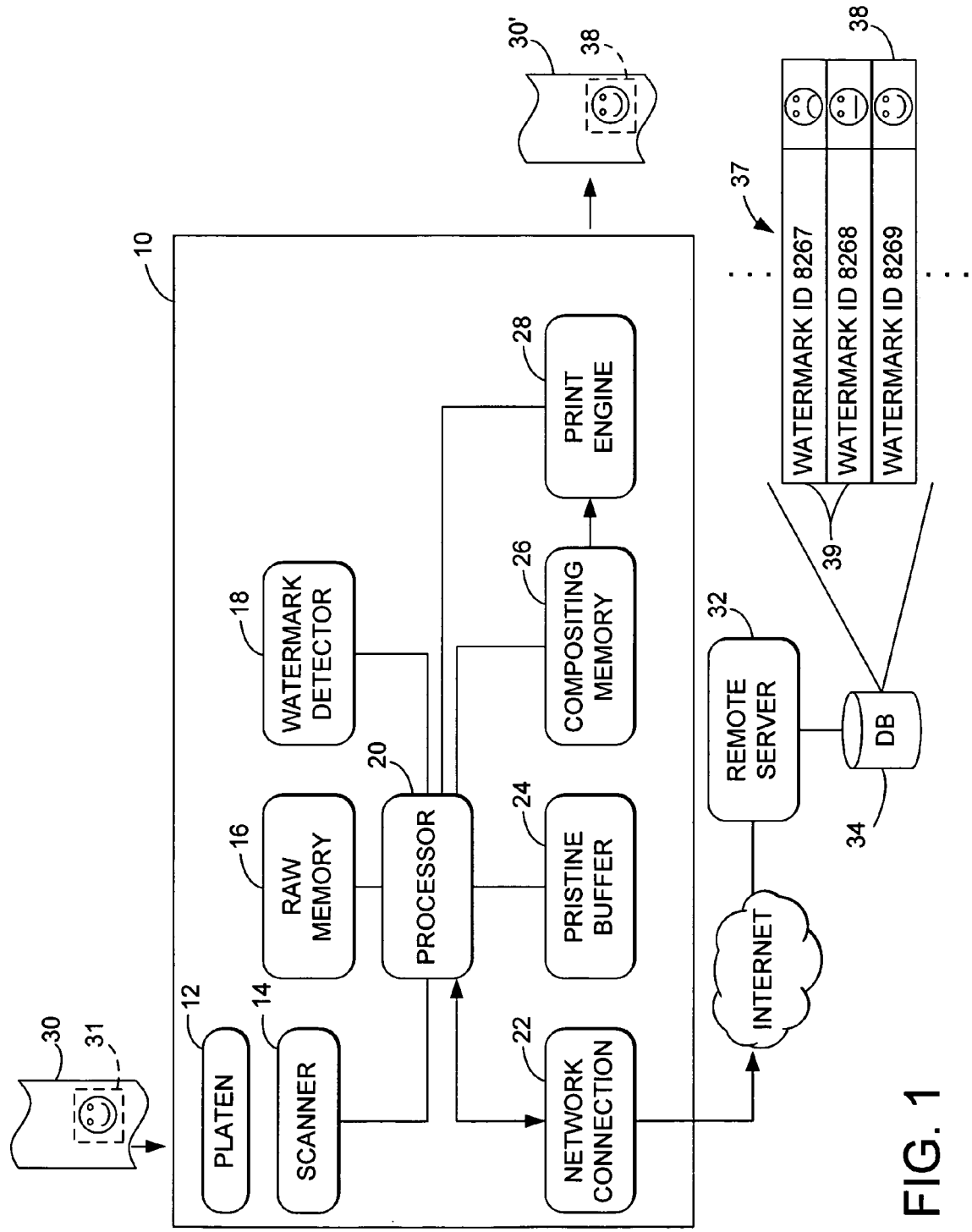
FIG. 1 shows an apparatus according to one embodiment of the present invention.

Referring to FIG. 1, an illustrative embodiment of the present invention is a photocopier 10. The photocopier includes a platen 12, a scanner assembly 14, a raw data memory 16, a watermark decoder 18, a processor 20, a network connection 22, a pristine image buffer 24, a compositing memory 26, and a reproduction engine 28.

A paper document, such as document 30, is placed on platen 12, and scanner assembly 14 is activated to generate scan data corresponding to the document. The scanner assembly is conventional and may include a linear array of CCD or CMOS sensor elements that optically scans along an axis of the platen to generate 2D image data. Alternatively, the scanner can comprise a 2D array of sensor elements onto which an image of the document is projected through one or more lenses. In the illustrated embodiment, the document 30 includes a picture 31 that is encoded with a plural-bit digital watermark. Document 30 may be referred to as a compound document since it incorporates plural components (e.g., text and picture).

The scan data from the scanner assembly 14 is stored in the raw data memory 16, where it is analyzed for the presence of watermark data by the watermark decoder 18.

There are many different techniques by which imagery can be digitally watermarked and decoded. One is the Digimarc watermark system detailed, e.g., in U.S. Pat. No. 5,862,260, and in pending application Ser. No. 09/452,023, filed Nov. 30, 1999 (now U.S. Pat. No. 6,408,082), the disclosures of which are incorporated herein by reference. A great variety of other systems are known. All that is required is that the watermark permit the conveyance of plural-bit auxiliary data without objectionable image degradation.

Upon detection of the watermark in picture 31, the processor 20 is programmed to initiate communication with a remote server 32 (e.g., over the internet) through the network connection 22. The programmed processor sends to the server a query message identifying the detected watermark (which may be, e.g., an identifier of 16–64 bits). A database 34 at the server 32 searches its records 37 for a digital object indexed by that watermark ID 39 and, if located, causes a pristine version of the object 38 (in this case a pristine version of the picture 31) to be sent to the photocopier.

In the embodiment illustrated, the database has the pristine version of the object stored within the database record for that watermark ID, and relays same directly back to the photocopier. In other embodiments, the object itself is not stored in the database. Instead, the database stores (in a record associated with the watermark ID) the address of a remote data repository at which the pristine object is stored. In this case the object server 32 can transmit an instruction to the remote repository (e.g., again over the internet), requesting the remote repository to provide the pristine object. The object can be sent directly from the remote data repository to the photocopier, or may be relayed through the object server 32. In any case, the pristine object may be provided in TIFF, JPEG, GIF, or other format. (In some embodiment, the request signal from the photocopier specifies the format desired, or may specify plural formats that the photocopier can accept, and the pristine object is then output by the server 32 or remote repository in such a format. In other embodiments, the request signal from the photocopier does not include any format data.)

In some embodiments, the object server 32 can be of the sort more particularly detailed in copending application Ser.

Nos. 60/164,619 (filed Nov. 10, 1999), and 09/343,104 (filed Jun. 29, 1999), the disclosures of which are incorporated herein by reference.

In addition to detecting the ID of any watermark in the scanned image data, the photocopier's watermark detector also discerns the placement of the watermarked picture within the document image, and its state (e.g., size, rotation, etc.), and produces corresponding state information. In some embodiments, this state information is passed to the object server 32, permitting the pristine object 38 to be sized/rotated/etc. (e.g., by the object server) to match the object detected in the document image. In other embodiments, a generic version of the pristine object is passed back to the photocopier, and the processor 20 attends to sizing, rotating, etc., of the pristine picture 38 as necessary to match that of the original picture 31.

In some embodiments the picture 31 in the paper document has been cropped. (The watermark can nonetheless be detected from the cropped image.) When the pristine picture 38 is received from the remote location, it can be pattern-matched to the picture 31 detected in the original document to determine the cropping boundaries (if any), and corresponding cropping of the pristine picture can be effected.

Once the foregoing scaling/rotation/cropping, etc., adjustments (if any) have been made on the pristine picture 38 stored in buffer 24, the processed pristine picture is combined with the original document scan data in compositing memory 26, yielding a composite document image that includes the pristine picture data 38 in lieu of the scanned picture 31. (The substitution of the pristine picture for the original picture data can be accomplished by various known image processing techniques, including masking, overwriting, etc.) The composite document image is then passed to the reproduction engine 28 to produce a hard-copy output (i.e., an enhanced compound document 30') in the conventional manner. (The reprographic engine 28 can take many different forms including, e.g., xerography, ink-jet printing, etc.)

The pristine picture 38 received from the server 32 can, itself, be watermarked or not. If watermarked, the watermark will usually convey the same payload information as the watermark in the original picture 31, although this need not always be the case. In other embodiments, the pristine picture 38 received from the remote server 32 has no watermark. In such case the pristine picture can be substituted into the compound document 30 in its unwatermarked state. Alternatively, the apparatus 10 can embed a watermark into the picture prior to (or as part of) the substitution operation.

If the substituted picture is watermarked, this permits later watermark-based enhancement or updating. For example, if the enhanced compound document 30' including the pristine picture 38 is printed by the photocopier, and the resulting photocopy is thereafter photocopied, the latter photocopying operation can again substitute pristine picture data for the scanned picture data produced by the second photocopier's scanner. Moreover, in applications where it is appropriate for a picture to be updated with the latest version whenever printed, the watermarking of the picture 38 permits substitution of a latest version whenever the document is scanned for printing.

In other situations, it is desirable for the picture 38 included in the enhanced compound document 30' to be unwatermarked. This is the case, for example, in certain archival applications where it is important that the document 30' not be changed after archiving. By assuring that the picture 38 is not watermarked, inadvertent changing of the picture in subsequent photocopying can be avoided. (In cases where the pristine image 38 is provided from server 32 in a watermarked state, the photocopier may remove or disable the watermark in response to corresponding instructions from a user through a user interface or the like.)

From the foregoing, it will be recognized that the illustrative embodiment can produce "photocopies" that are better than the "originals." This is accomplished by watermark-based substitution of pristine digital objects to replace less pristine counterparts.

Having described and illustrated the principles of our invention with reference to an illustrative embodiment, it will be recognized the invention is not so limited.

For example, while the invention is particularly illustrated with reference to a photocopier, the same principles are equally applicable in other systems, including personal computers (e.g., in conjunction with image editing software, such as Adobe Photoshop). In such case the input image data needn't come from a scanner but may come, e.g., from a digital file, from a network location, etc.

Likewise, while the invention is particularly illustrated with reference to picture (i.e., graphic) data, the same principles are equally applicable in connection with other data types, such as video, sound, text, etc. Moreover, the reference to "documents" is illustrative only; the invention can similarly be employed with any compound object that includes a watermarked component—whether in digital or analog form.

While the detailed embodiment is described as using separate raw data memory 16, pristine image buffer 24, and compositing memory 26, more typically some or all of these functions are served by a single memory, which may be a computer system's main RAM memory.

Likewise, while the detailed embodiment employs a processor 20 programmed in accordance with software instructions (e.g., stored in a memory or on a storage medium), in other embodiments some or all of the described functionality can be achieved using dedicated hardware (e.g., ASICs), or programmable hardware (e.g., PLAs).

Still further, while the invention is illustrated with reference to an arrangement in which a document includes a single watermarked photograph, it will be recognized that plural such watermarked components may be present in a compound document, and the system may be arranged to obtain pristine versions of each, and edit/composite same as necessary as to recreate an enhanced version of the original document.

Moreover, while the illustrative embodiment contemplates that a watermarked photograph may be a component of the original document, in other embodiments the watermarked object may comprise the entirety of the original document.

While reference has been made to substitution of pristine image components, in some embodiments it may be desirable to substitute components that are not "pristine." Indeed, in some embodiments an object may be substituted that is visually dissimilar to the original object. Consider artwork for a Christmas card. The artwork may include a watermarked "generic" corporate logo. When encountered by a computer according to the present invention, the generic logo may be replaced with a logo corresponding to the corporate owner of the computer. In such case, the substitute imagery may be stored within the computer itself, obviating the need for any network connection. The registry database maintained by the computer's operating system may include keys defined by watermark IDs.

When a watermark ID is encountered, the registry database can be consulted to identify a corresponding graphic that can be substituted into the object being processed. If none is found, the watermark ID can be passed to the remote server 32.

While, for expository convenience, the illustrative embodiment was described as always substituting pristine data when available, more typically this is a function that would be enabled or disabled by an operator of the device, e.g., by an appropriate switch, button, or user interface control. In some embodiments, the device may be arranged to query the user when substitution of a pristine component is possible, in some cases presenting the user with a depiction of the image component proposed to be substituted.

The illustrative embodiment may be said to employ watermark-based object embedding, since the hard-copy output is static (i.e., cannot change) after printing. In other embodiments, the enhanced compound document 30' is not printed, but stored. Each time the compound document is utilized (e.g., opened for editing, or printed), any watermarked component(s) therein can be updated to include the latest-available version(s) of the watermarked component(s). In such case, the document may be said to employ watermark-based object linking.

In view of the many embodiments to which the principles of our invention may be applied, it should be apparent that the detailed embodiment is illustrative only and should not be taken as limiting the scope of our invention. Rather, we claim as our invention all such modifications as may fall within the scope and spirit of the following claims, and equivalents thereto.

What is claimed is:

1. A method to provide a substitute image for an image found in a printed photograph, wherein the substitute image is to be provided in a printed copy of the printed photograph, and wherein the printed photograph comprises a digital watermark including a plural-bit identifier, said method comprising:
   after receipt of optical scan data corresponding to at least a portion of the printed photograph, decoding the digital watermark from the optical scan data to obtain the plural-bit identifier;
   using the plural-bit identifier to identify a storage location of the substitute image;
   requesting a digital copy of the substitute image;
   receiving the digital copy of the substitute image from the location; and
   when generating a printed copy of the printed photograph, using the digital copy of the substitute image instead of the image found in the printed photograph.

2. The method of claim 1 in which the storage location is co-located with a processor that performs said method.

3. The method of claim 1 in which the storage location is remotely located from a processor that performs said method.

4. The method of claim 1 in which the digital copy of the substitute image comprises a digital watermark embedded therein, and the watermark survives printing of the digital copy.

5. Computer readable storage medium comprising executable instructions stored thereon, said instructions comprising instructions to carry out the method of claim 1.

6. A printing device comprising:
   electronic processing circuitry; and
   memory, wherein said memory comprises instructions stored therein for execution by said electronic processing circuitry, said instructions comprising instructions to carry out the method of claim 1.

7. A computer in communication with a printing device, said computer comprising:
   a processor;
   a communications port to communicate with the printing device; and
   memory, wherein said memory comprises instructions stored therein for execution by said electronic processing circuitry, said instructions comprising instructions to carry out the method of claim 1, the result of which is to control the printing device to generate a printed copy of the printed photograph, using the digital copy of the substitute image instead of the image found in the printed photograph.

8. A method to provide a first substitute image for a first image found in a composite printed document and a second substitute image for a second image found in the composite printed document, wherein the first image comprises a first digital watermark including a first plural-bit identifier and the second image comprises a second digital watermark including a second plural-bit identifier, said method comprising:
   after receipt of optical scan data corresponding to at least a portion of the printed document, decoding the first digital watermark and the second digital watermark from the optical scan data to obtain the first plural-bit identifier and the second plural-bit identifier;
   using the first plural-bit identifier and the second plural-bit identifier to obtain the first substitute image and the second substitute image; and
   when generating a printed copy of the first image and a printed copy of the second image, using the first substitute image and the second substitute image instead of the first image and second image found in the composite printed document.

9. The method of claim 8 further comprising presenting a user with one or more options through a user interface.

10. The method of claim 9 wherein at least one option comprises, prior to generating printed copies, an image editing option.

11. The method of claim 9 wherein at least one option comprises determining whether to substitute the first substitute image and the second substitute image for the first image and the second image.

12. The method of claim 8 wherein the first substitute image comprises a relatively pristine version of the first image.

13. The method of claim 12 wherein the second substitute image comprises a relatively pristine version of the second image.

14. The method of claim 8 wherein the printed copy of the first image and the printed copy of the second image are printed on separate sheets.

15. The method of claim 8 wherein the printed copy of the first image and the printed copy of the second image are printed together on one sheet.

16. Computer readable storage medium comprising executable instructions stored thereon, said instructions comprising instructions to carry out the method of claim 8.

17. A printing device comprising:
   electronic processing circuitry; and
   memory, wherein said memory comprises instructions stored therein for execution by said electronic processing circuitry, said instructions comprising instructions to carry out the method of claim 8.

18. A computer in communication with a printing device, said computer comprising:
- a processor;
- a communications port to communicate with the printing device; and
- memory, wherein said memory comprises instructions stored therein for execution by said electronic processing circuitry, said instructions comprising instructions to carry out the method of claim 8, the result of which is to control the printing device to generate a printed copy of the first image and a printed copy of the second image, using the first substitute image and the second substitute image instead of the first image and second image found in the composite printed document.

* * * * *